United States Patent
Selfridge et al.

(10) Patent No.: US 6,352,374 B1
(45) Date of Patent: Mar. 5, 2002

(54) FIBER OPTIC CONNECTOR DEVICE

(75) Inventors: Ritch Allen Selfridge, Sidney; Robert Kenneth Chapman, West Winfield, both of NY (US)

(73) Assignee: Amphenol Corporation, Wallingford, CT (US)

(*) Notice: Subject to any disclaimer, the term of this patent is extended or adjusted under 35 U.S.C. 154(b) by 93 days.

(21) Appl. No.: 09/589,347

(22) Filed: Jun. 8, 2000

(51) Int. Cl.$^7$ .................................................. G02B 6/36
(52) U.S. Cl. .......................... 385/76; 385/32; 385/39; 385/53; 385/54; 385/77; 385/100; 385/114; 385/136; 385/137
(58) Field of Search ........................... 385/15, 31, 32, 385/39, 53, 54, 76, 77, 100, 114, 115, 134, 135, 136, 137, 147

(56) References Cited

U.S. PATENT DOCUMENTS

| | | | |
|---|---|---|---|
| 4,632,506 A | 12/1986 | Taylor ..................... | 385/100 X |
| 4,708,430 A | 11/1987 | Donaldson et al. ..... | 385/134 X |
| 4,717,231 A | * 1/1988 | Dewez et al. ........... | 385/135 X |
| 4,846,566 A | 7/1989 | Barnett et al. ........... | 385/100 X |
| 5,115,260 A | 5/1992 | Hayward et al. .......... | 385/100 |
| 5,155,785 A | * 10/1992 | Holland et al. ............... | 385/89 |
| 5,461,690 A | * 10/1995 | Lampert ..................... | 385/100 |
| 5,511,144 A | 4/1996 | Hawkins et al. ............. | 385/135 |
| 5,638,481 A | * 6/1997 | Arnett ......................... | 385/135 |
| 5,907,654 A | * 5/1999 | Render et al. ............... | 385/135 |
| 5,913,006 A | 6/1999 | Summach .................... | 385/134 |
| 5,923,807 A | 7/1999 | Wild ........................... | 385/135 |
| 5,926,589 A | 7/1999 | Gaeta .......................... | 385/16 |
| 5,980,312 A | 11/1999 | Chapman et al. ......... | 439/540.1 |

* cited by examiner

*Primary Examiner*—Brian Healy
(74) *Attorney, Agent, or Firm*—Blank Rome, LLP

(57) ABSTRACT

A fiber optic connector transmits light and includes a body member and at least one strand of optical transmitting material. The body member is formed in a generally U-shaped configuration to define a first linear segment, a second linear segment and a looped segment that interconnects the first and second linear segments. The first and second linear segments extend generally parallel with one another and are disposed apart from one another at a spaced distance. The at least one strand of optical transmitting material is carried by the body member to conform to the generally U-shaped configuration and has a minimum bend radius for transmitting light. The looped segment has an inner radius curvature greater than one half of the spaced distance and is at least equal to or greater than the minimum bend radius for transmitting light. Another embodiment includes fiber optic ribbon fabric as the body member which is formed into a serpentine configuration to define an array of linear segments and a plurality of looped segments. This embodiment selectively and optically connects together a plurality of modules arranged in a juxtaposed relationship.

25 Claims, 6 Drawing Sheets

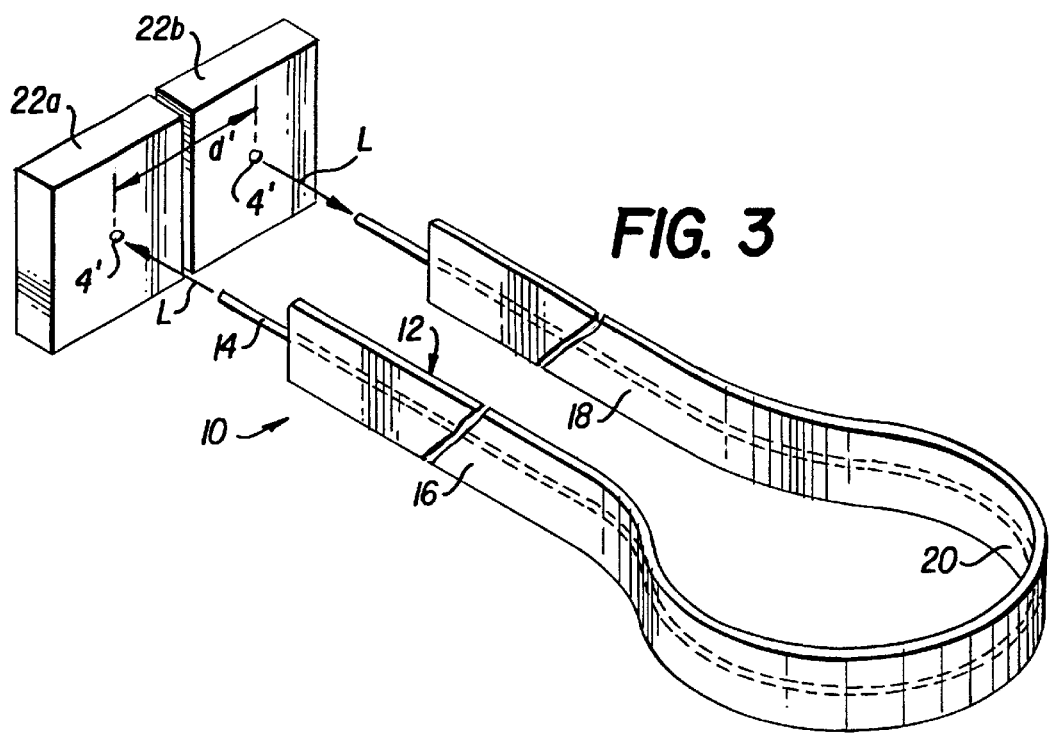
FIG. 3
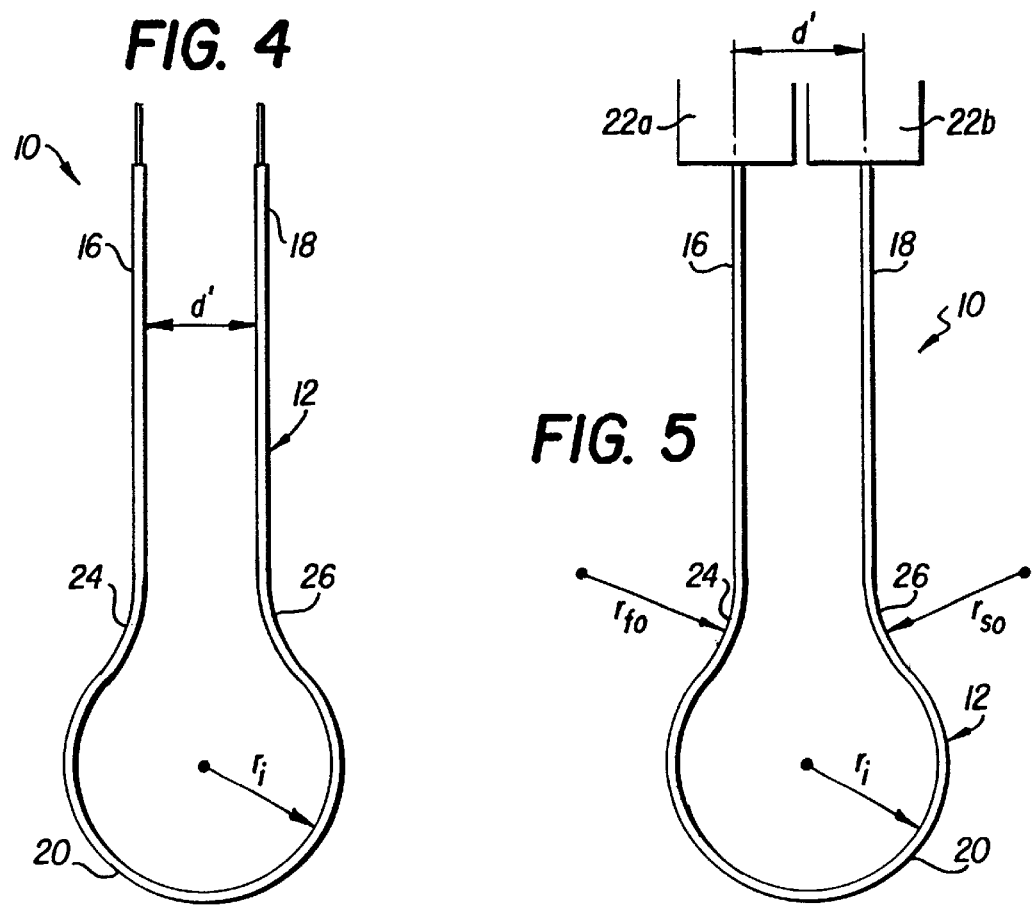
FIG. 4
FIG. 5

FIBER OPTIC CONNECTOR DEVICE

FIELD OF THE INVENTION

The invention is directed to a fiber optic connector device. More particularly, the invention is directed to a fiber optic connector device that optically connects together electronic modules.

BACKGROUND OF THE INVENTION

The "need for speed" in today's electronic world continues to drive the evolution of microprocessors and systems that support them. With each new generation of microprocessors, the promise of increased throughput can only be realized if the slowest link in the support system can be improved. Without opening the bottlenecks, the increased speed of a new microprocessor will be effectively slowed to the pace of the bottleneck system component. Thus, the new high speed microprocessor is typically left idling nonproductively while waiting for the support systems to perform.

Most microprocessor devices, both for computation and for communication, operate based on the flow of electrons and the transmission of electromagnetic fields with wavelengths typically longer than one centimeter. The speed at which a signal can be successfully transmitted in these devices is typically inversely proportional to the distance over which the information needs to travel.

To overcome this problem of decreased speed at longer distances, these electronic devices have been adapted to communicate optically through photons and electromagnetic fields with wavelengths typically shorter than two micrometers. Optical signals traveling in optical waveguides still suffer from degradation over long distances but they are several orders of magnitude better than electrical signals. While these systems still process electrical signals, they are dependent upon optics to communicate over large distances. In this sense, the connectivity between processing nodes is optical.

In electronic devices, the speed bottlenecks typically occur in printed circuit boards and electrical connectors. The transmission line structures created within these components have a finite bandwidth, limiting the ability of the innerconnect to faithfully reproduce the original signal at the signal destination. Parasitic effects distort the signals, requiring a settling time before the transmission line can be sampled. Additionally, these electrical signals are susceptible to electromagnetic interference and data can be corrupted due to unwanted electrical interference.

Even though efforts are underway for creating higher bandwidth electrical interconnect solutions, the current bandwidth is typically less than two GHz depending on the desired transmission line characteristics. Using optics, the interconnect system does not represent the system bottleneck. In fact, optical systems have bandwidths in excess of 100 GHz which is well beyond the optical-electrical transducer capacity that is available today. Potentially, optical bandwidths could be high as 100,000 GHz.

Even though electrical interconnect systems have such limitations, many users are more comfortable with the proven performance of electrical interconnections over optical interconnections, particularly in harsh environments such as for use in military operations. Also, in military operations, size and weight of system components are critical. It is preferred that the size and weight be kept at a minimum because availability of space and carrying capacity, for example, on aircraft and submarines, are paramount. In FIG. 1, electronic modules M1–M6 are organized in a side by side fashion and secured in a rack 2. Each of the electronic modules M1–M6 includes a plurality of optical receptacles 4 that receive terminations 6. Selected pairs of the terminations 6 are interconnected by individual ones of optical cable 8.

In order to effectively make an optical connection between selected pairs of electronic modules M1–M6, it is imperative that the optical cable bends about a radius that is larger than the minimum bend radius $r_{min}$ of the optical fibers contained within the optical cable 8. For example, in a worst case scenario, connecting position M1A with position M2A is illustrated in FIG. 2. A distance "d" is determined between center points of the positions M1A and M2A which usually represents a width of the module. To effectively optically connect electronic modules M1 and M2 at positions M1A and M2A, the optical cable 8, at a minimum, forms a semicircular loop having an inner radius $r_i$ that is at least equal to or greater than one half times the distance d. If the optical cable 8 is bent about a radius less than the minimium bend radius $r_{min}$, the optical signal either degrades or it becomes corrupted rendering the optical signal unreliable.

Assume, for purposes of example, that the minimum bend radius $R_{min}$ of the optical cable 8 is 0.5 inches. Further, assume that the distance d is 1.0 inch. Applying the formula that the minimum bend radius $r_{min}$ is greater than or equal to one half of the distance d, the result is 0.5 inches which is greater than or equal to 0.5 inches. Thus, the optical cable 8 having an inner radius 0.5 inches will transmit a reliable optical signal between the electronic modules.

However, assume also for example, that the electronic modules are narrower and, thus, the distance d is smaller. Assume that the distance d is 0.8 inches. If the minimum bend radius $r_{min}$ is 0.5 inches and one half of the distance d is 0.4 inches, the optical interconnection between positions M1A and M2A shown in FIG. 2 will not yield a reliable optical signal because the minimum bend radius $r_{min}$ 0.5 inches is greater than the inner radius $r_i$, 0.4 inches of the optical cable 8. In short, narrowing the electronic modules M1–M6 will require new ways for making the optical interconnections therebetween.

Additionally, as the electronic modules M1–M6 become more compact with miniaturized electrical circuits, more optical receptacles may be added. Thus, the interconnection of the multiple optical receptacles becomes more complex. As shown in FIG. 1, several of the optical cables 8 are shown crisscrossing each other. As more and more optical receptacles 4 are added to the electronic modules, a "bird's nest" arrangement of the optical cables is created. As a result, complexity of optically connecting and disconnecting the electronic modules becomes complex. Such complexities defeats the purpose of having individual electronic modules contained within the rack 2. A modular design should afford quick and simple replacement of any of the electronic modules. A "bird's nest" arrangement of the optical cables 8 thwarts the goal of modular design.

OBJECTS AND SUMMARY OF THE INVENTION

It is an object of the invention to provide a single fiber optic connector device for optically connecting a plurality of racked electronic modules.

It is another object of the invention to provide a single fiber optic connector device that can be easily installed onto a plurality of electronic modules without creating a "bird's nest" effect.

Another object of the invention is to provide a single fiber optic connector device that can be used with electronic modules without consideration of the width of any of the modules.

Yet another object of the invention is to provide a single fiber optic connector device that can be easily removed from a plurality of electronic modules and easily replaced without reference to an installation manual designating the appropriate optical receptacles for the appropriate terminations.

Accordingly, a fiber optic connector of the invention is described. One embodiment of the fiber optic connector of the invention transmits light and includes a body member and at least one strand of optical transmitting material. The body member is formed in a generally U-shaped configuration to define a first linear segment, a second linear segment and a looped segment interconnecting the first and second linear segments. The first and second linear segments extend generally parallel with one another and are disposed apart from one another at a spaced distance. The at least one strand of the optical transmitting material is carried by the body member to conform to the general U-shaped configuration and has a minimum bend radius for transmitting light around the looped segment. The looped segment has an inner radius of curvature greater than one half of the spaced distance and is at least equal to or greater than the minimum bend radius.

Another embodiment of the fiber optic connector of the invention includes an elongated fiber optic ribbon fabric that carries a plurality of fiber optic strands of optical transmitting material with each fiber optic strand having a minimum bend radius. The fiber optic ribbon fabric forms a serpentine configuration to define an array of linear segments and a plurality of looped segments. The array of linear segments is disposed in a generally parallel, sequential relationship at a spaced distance between sequential ones of the linear segments. A respective one of the looped segments interconnects the sequential ones of the array of linear segments. Each linear segment has at least one leg extending from a lateral edge of the fiber optic ribbon fabric. Each looped segment has an inner radius of curvature greater than one half of the spaced distance and at least equal to or greater than the minimum bend radius so that light can be transmitted from one leg to another leg through the fiber optic ribbon fabric.

Another embodiment of the invention is the fiber optic connector that selectively and optically connects together a plurality of modules arranged in a juxtaposed relationship. Each module has at least one optical receptacle formed therein. The fiber optic connector of the invention includes an elongated fiber optic ribbon fabric as described above. Each linear segment has at least one leg extending from a common lateral edge of the fiber optic ribbon fabric and is positioned along the common lateral edge to align with and engage the optical receptacles in each of the modules to optically connect together the plurality of modules thereby causing sequential ones of the array of linear segments to be disposed apart from one another at a spaced distance. Each looped segment has an inner radius of curvature as described above so that light maybe transmitted from one module to another.

BRIEF DESCRIPTION OF THE DRAWINGS

FIG. 3 is a perspective view of a first embodiment of a fiber optic connector device of the invention positioned in front of a conventional optical receptacle.

FIG. 4 is a top planar view of the fiber optic connector device of the invention shown in FIG. 3.

FIG. 5 is a top planar view of the fiber optic connector device of the invention illustrating a looped segment having a constant inner radius of curvature forming a generally circular shape.

DETAILED DESCRIPTION OF THE EXEMPLARY EMBODIMENTS

Figure 1:
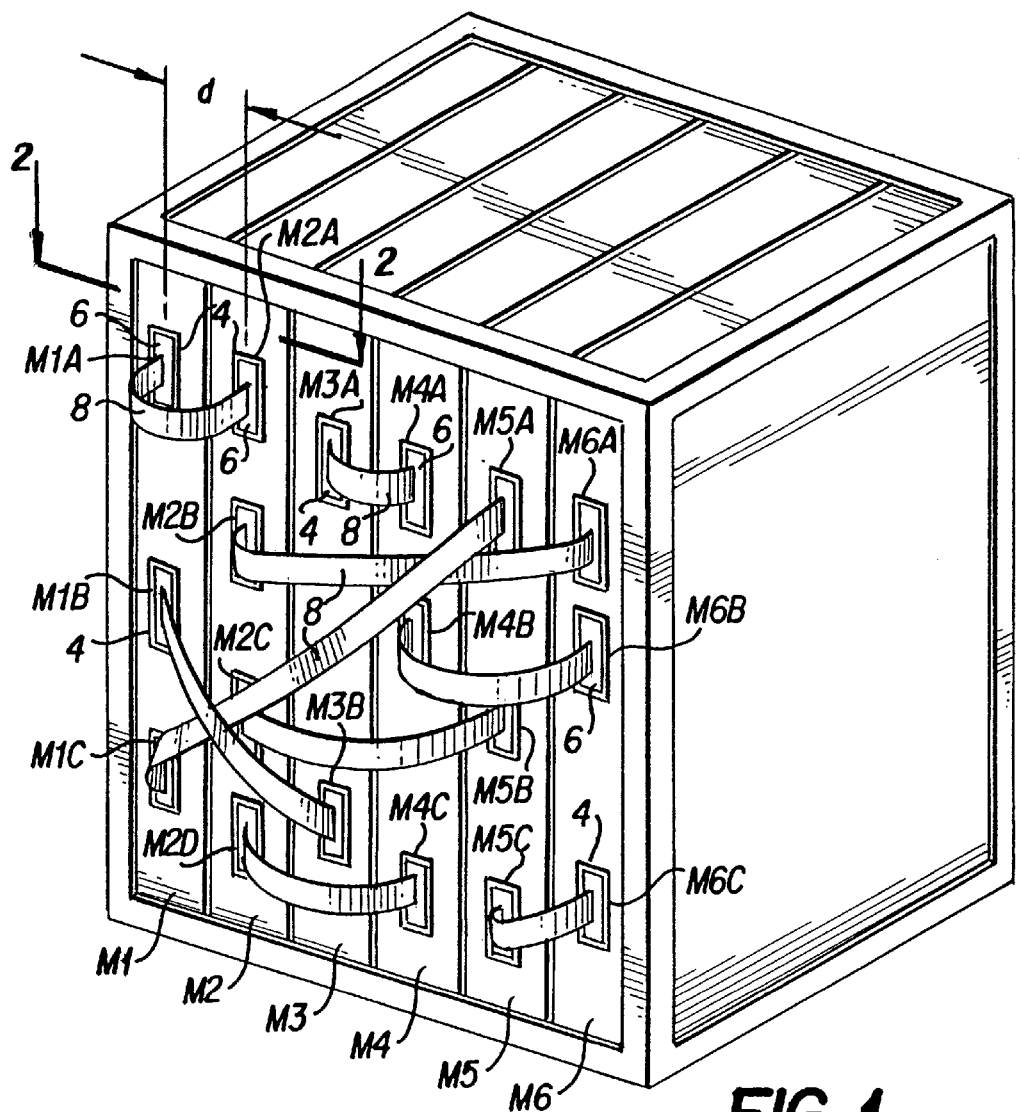
FIG. 1 is a perspective view of a conventional assembly of electronic modules disposed in a juxtaposed relationship and contained within a rack.
Figure 2:
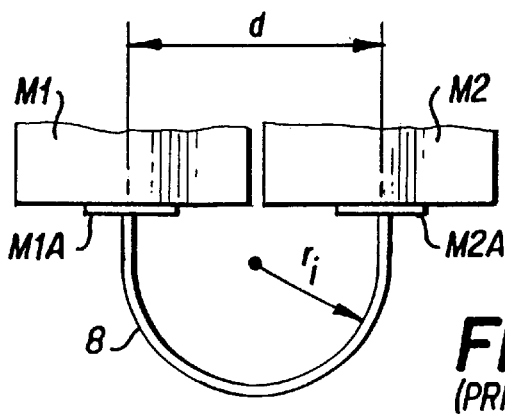
FIG. 2 is a partial top planar view of FIG. 1.

A first exemplary embodiment of a fiber optic connector 10 of the invention is generally introduced in FIGS. 3–5. The fiber optic connector 10 is used for transmitting light L represented by the arrows from one point to another. The fiber optic connector 10 of the invention includes a body member 12 and at least one strand of optical transmitting material 14. One of ordinary skill in the art would appreciate that the at least one strand 14 of the optical transmitted material can be either a single strand or multiple strands as is well known in the art. For simplicity of discussion, the at least one strand 14 of optical transmitting material will be referred to as a strand of optical transmitting material regardless if it is one strand or multiple strands which can be fabricated from either glass fiber or plastic fiber.

As best shown in FIGS. 3 and 4, the body member 12 is formed in a generally U-shaped configuration which defines a first linear segment 16, a second linear segment 18 and a looped segment 20. The looped segment 20 interconnects the first and second linear segments 16 and 18 respectively, thus forming the generally U-shaped configuration. The first and second linear segments 16 and 18 extend generally parallel with one another and are disposed apart from one another at a spaced distance d'. The spaced distance d' corresponds to the centerline distance between optical receptacles 4' formed into a pair of juxtaposed fiber optic cable modules 22a and 222b shown by way of example only in FIGS. 3 and 5. The strand 14 of optical transmitting material is carried by the body member 12 in such a manner that the strand 14 of optical transmitting material conforms to the generally U-shaped configuration. As is commonly known in the art, the strand 14 of optical transmitting material has a minimum bend radius whereby bending the strand of optical transmitting material beyond the minimum bend radius results in degradation or corruption of the light L being transmitted through the strand 14. The strand 14 of optical transmitting material transmits light L around the looped segment 20 because, the looped segment 20 has an inner radius $r_i$ of curvature that is greater than one half of the spaced distance d' and at least equal to or greater than the minimum bend radius $r_{min}$.

The body member 12 is fabricated from at least one sheet of thin film that is commonly used in the fiber optics industry. For the first exemplary embodiment of the fiber optic connector 10 of the invention, the strand 14 of the optical transmitting material is embedded into the body member 12 to form a conventional polymeric waveguide. Although other materials might be available for fabrication of the body member 12 and the strand 14, preferably, the fiber optic connector 10 of the invention is fabricated from a stiff yet flexible material.

In FIGS. 4 and 5, the inner radius $r_i$ of curvature of the looped segment 20 is constant. With a constant inner radius $r_i$ of curvature, the looped segment 20 forms a substantially circular configuration.

In FIGS. 4 and 5, the looped segment 20 includes a first transition looped segment portion 24 and a second transition looped segment portion 26. The first and second transition looped segment portions 24 and 26 connect the looped segment 20 to respective ones of the first and second linear segments 16 and 18. Further, the first transition looped segment portion 24 has a first outer radius $r_{fo}$ and the second transition looped segment portion 26 has a second outer radius of curvature $r_{sO}$. For the first embodiment of the fiber optic connector 10 of the invention, the first and second outer radii $r_{fo}$ and $r_{sO}$ are equal to each other. Also, the first and second outer radii of curvature $r_{fo}$ and $r_{sO}$ must be at least equal to or greater than the minimum bend radius $r_{min}$ of the strand 14 of the optical transmitting material.

Figure 6:
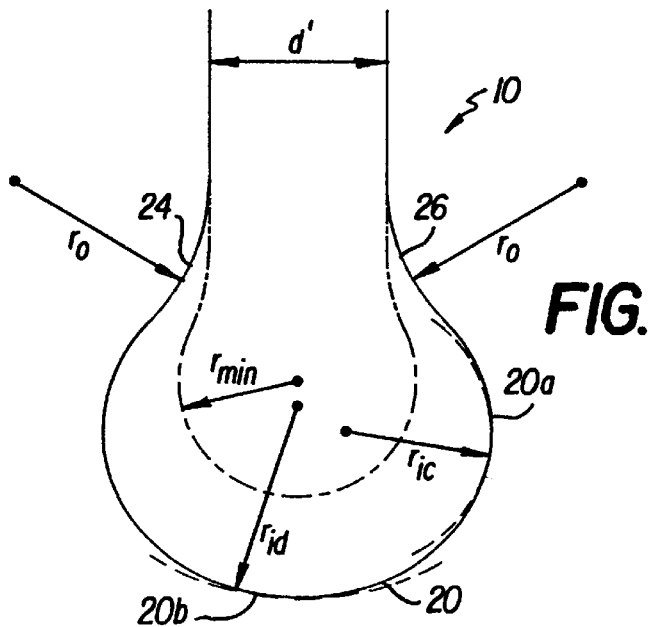
FIG. 6 is a top planar view of the fiber optic connector device of the invention illustrating the looped segment having a variable inner radius of curvature forming a generally elliptical shape.
Figure 7:
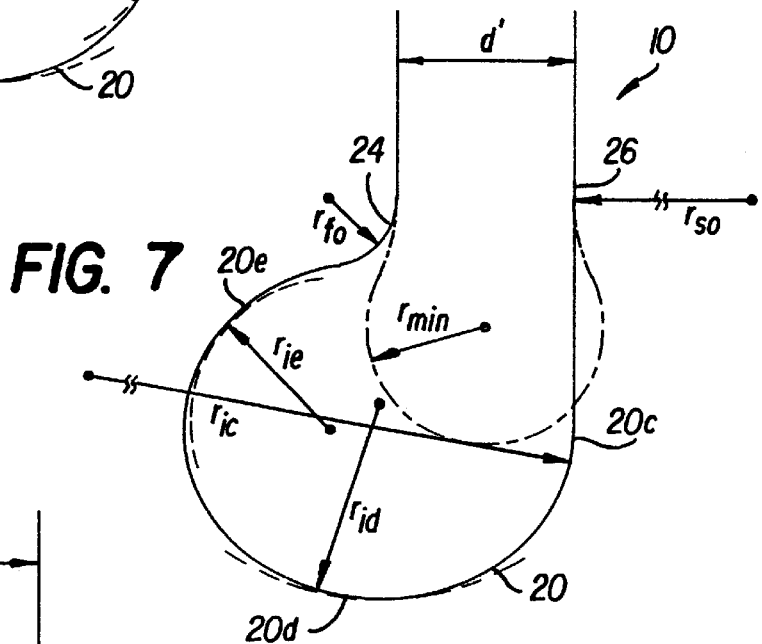
FIG. 7 is a top planar view of the fiber optic connector device of the invention illustrating the looped segment having a variable inner radius of curvature forming a generally oblong shape.
Figure 8:
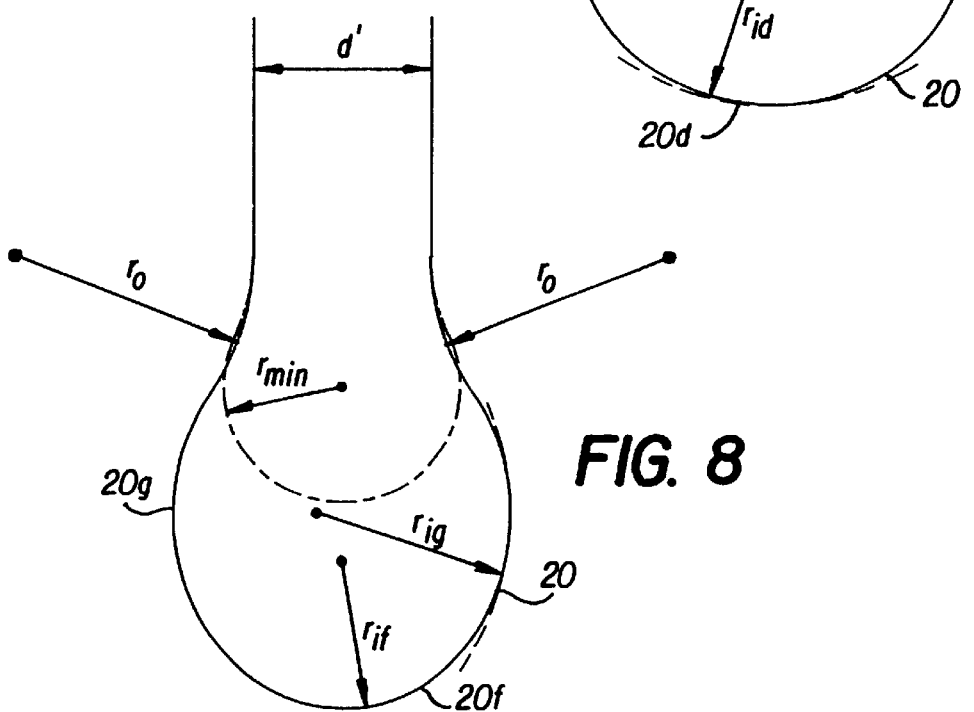
FIG. 8 is a top planar view of the fiber optic connector device of the invention illustrating the looped segment having a different variable inner radius curvature forming a different generally oblong shape.

Although the looped segment 20 is illustrated in FIG. 5 as a substantial circular configuration, the looped segment 20 can assume other configurations. In FIGS. 6–8, the inner radius $r_i$ of curvature of the looped segment 20 is variable. Thus, the configuration of the looped segment 20 is also variable. The configurations illustrated in FIGS. 6–8 are examples of different configurations of the looped segment 20 with a variable inner radius $r_i$ of curvature. In each instance, the looped segment 20 includes a plurality of a looped segment portions. In brief, at least one looped segment portion of the first inner radius of curvature and another looped segment portion of a second inner radius of curvature that is different from the first inner radius. In FIG. 6, a looped segment portion 20a is formed at an inner radius $r_{ia}$ while a looped segment portion 20b is formed at an inner radius rib to form a substantially elliptical configuration of the looped segment 20. However, the outer radius r0 of the first and second transition looped segment portions 24 and 26 are equal. In FIG. 7, a looped segment portion 20c is straight and is considered to be formed with an infinite inner radius $r_{ic}$; a looped segment portion 20d is formed with an inner radius $r_{id}$; and, looped segment portion 20e is formed as an inner radius $r_{ie}$ to form an oblong configuration. Each of these three inner radii are different from one another. However, the outer radius $r_{fo}$ of the first transition loop segment portion 24 is different from the second transition looped portion 26. Theoretically, the outer radius $r_{sO}$ of the second transition loop segment portion 26 is infinite. In FIG. 8, a looped segment portion 20f is formed with an inner radius $r_{if}$ and a looped segment portion 20g is formed with an inner radius $r_{ig}$ which are different from one another. The resulting configuration of the looped segment is a different oblong configuration. In all instances, a one half of the spaced distance d' is less than the minimum bend radius $r_{min}$ of the looped segment 20.

Figure 9:
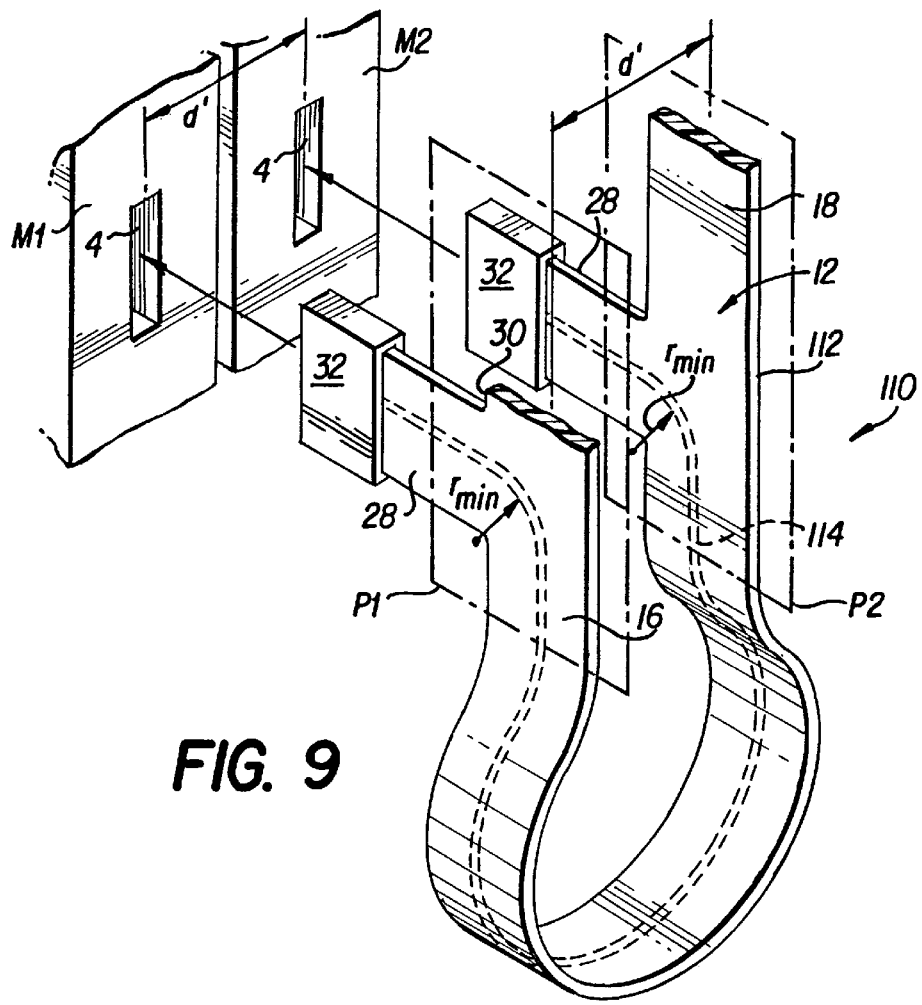
FIG. 9 is perspective view of a second exemplary embodiment of the fiber optic connector device of the invention disposed above a pair of conventional optical receptacles.

A second exemplary embodiment of the fiber optic connector 110 of the invention is introduced in FIG. 9. The fiber optic connector 110 of the invention includes the body member 12 that is in a form of a conventional fiber optic ribbon fabric 112 that carries a plurality of fiber optic strands 114 of optical transmitting material. One of ordinary skill in the art would appreciate that the single fiber optic strand 114 of the optical transmitting material is also representative of a plurality of fiber optic strands.

Figure 10:
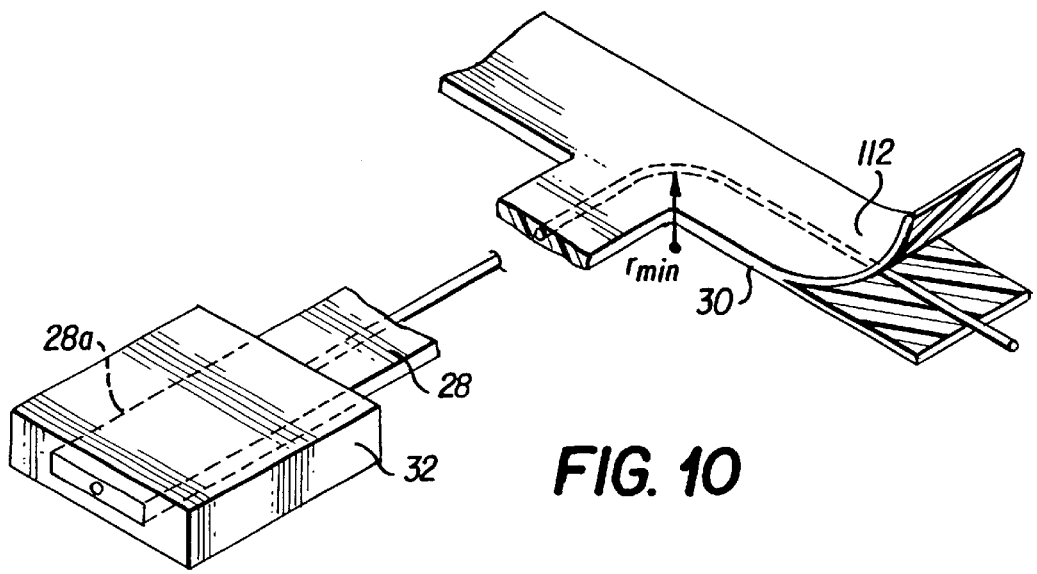
FIG. 10 is an enlarged partial perspective view of conventional fiber optic ribbon fabric showing a leg and a termination connected to the leg.

For the second exemplary embodiment of the fiber optic connector 110 of the invention, the fiber optic ribbon fabric 112 includes a plurality of legs 28. One leg 28 extends from a respective lateral edge 30 of the first and second linear segments 16 and 18. Although not by way of limitation, each one of the legs 28 extends from a common lateral edge 30 of the fiber optic ribbon fabric 112 and terminates at a distal end leg portion 28a and its best shown in FIG. 10. The fiber optic ribbon fabric 112 also includes a plurality of terminations 32. One termination 32 is connected to each one of the distal end leg portions 28a as shown in FIG.10. The strand 114 of optical transmitting material extends to and between the two respective terminations 32 through the respective legs 28 and the body member 12 so that light can be transmitted from one termination 32 to the other termination 32. The terminations 32, which are conventional terminations such as MT ferrules, are sized and adapted for insertion into the optical receptacles 4 in the electronic modules M1 and M2.

As is commonly known by one of ordinary skill in the art, the strand 114 of optical transmitting material must bend at a radius equal to or greater than the minimum bend radius $r_{min}$ in order for the strand 114 of the optical transmitting material to properly transmit light through the fiber optic ribbon fabric 112, as illustrated in FIG. 9. Furthermore, although not by way of limitation, each leg 28 of the respective first and second linear segments 16 and 18 are disposed in respective planes. Specifically, the first linear segment 16 and the leg 28 connected thereto is disposed in plane P1 and the second linear segment 18 and the leg 28 are disposed in plane P2, both planes being drawn in phantom.

Figure 11:
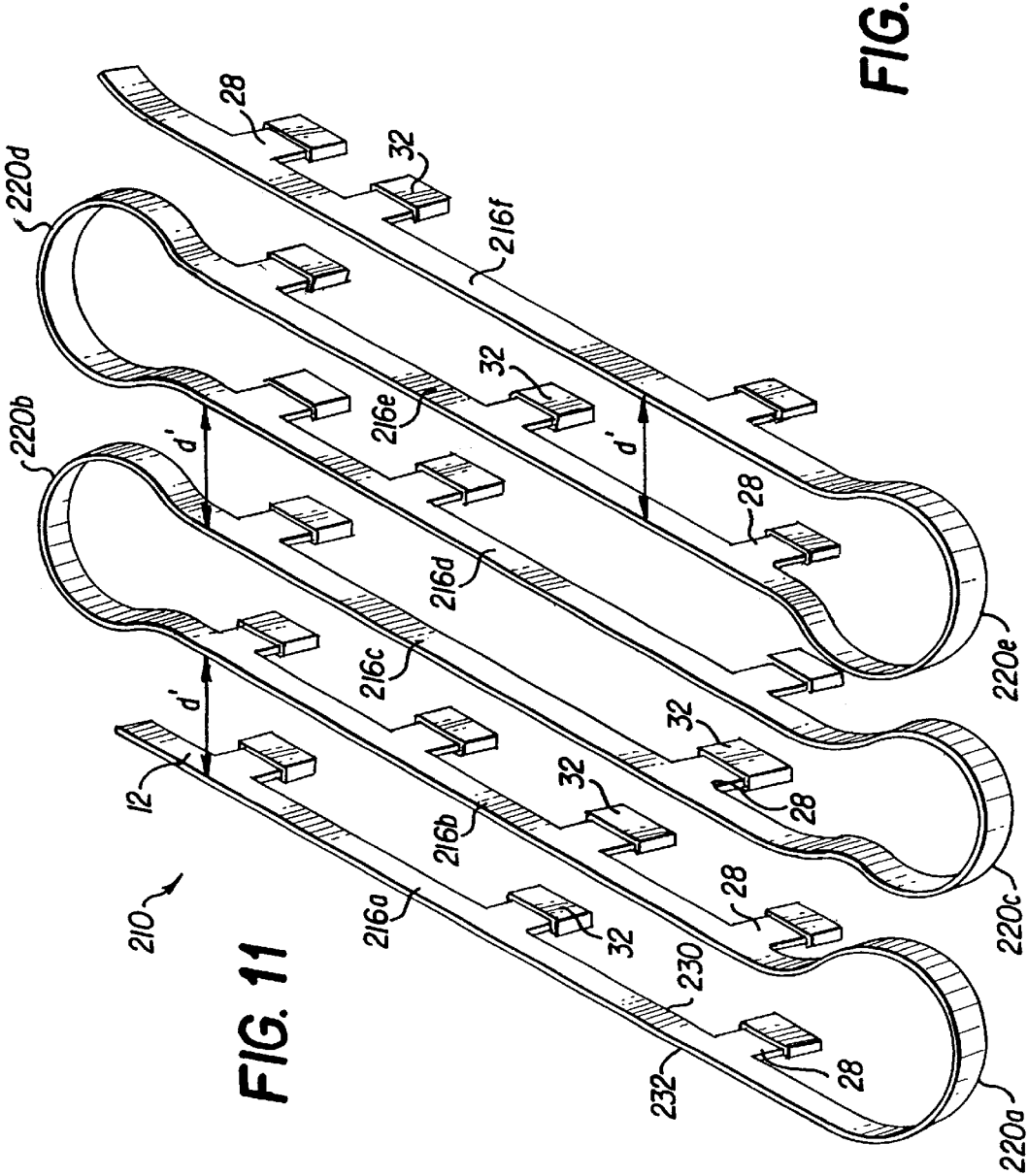
FIG. 11 is perspective view of a third exemplary embodiment of the fiber optic connector device of the invention.
Figure 13:
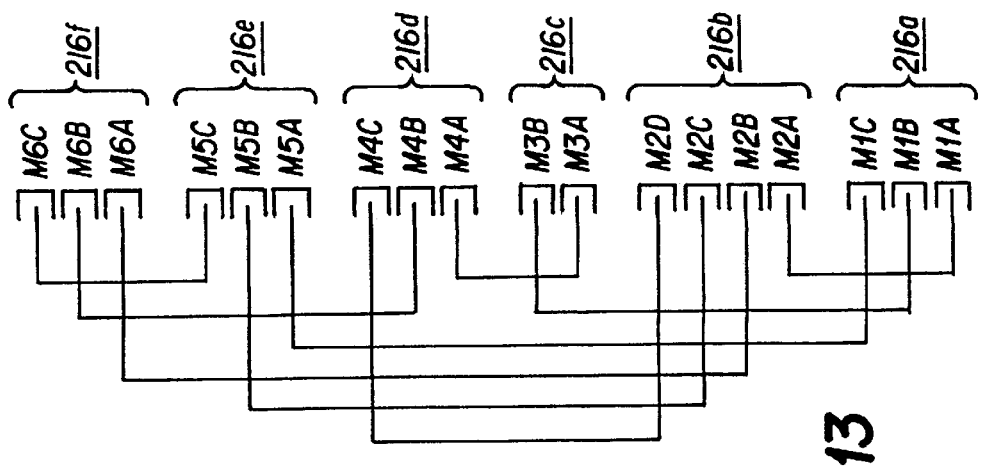
FIG. 13 is a diagrammatic view depicting the optical connections made by the fiber optic connector device in FIG. 12.
Figure 12:
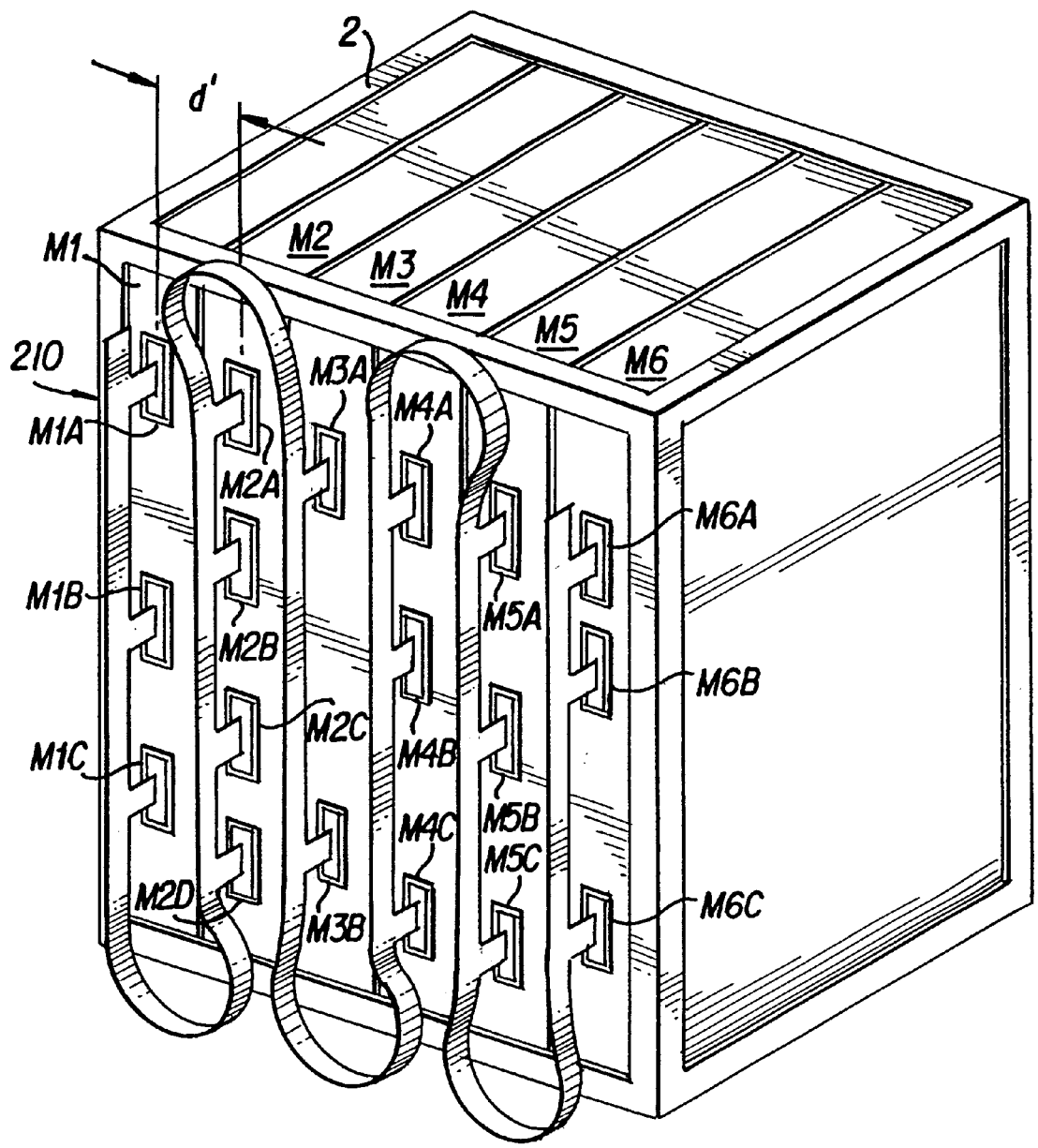
FIG. 12 is a perspective of the fiber optic connector article of the invention in FIG. 11 installed onto the conventional rack of electronic modules as shown in FIG. 1.

A third exemplary embodiment of a fiber optic connector 210 of the invention is introduced in FIGS. 11–13. The fiber optic connector 210 includes the body member 12 in the form of the fiber optic ribbon fabric mentioned above. The body member 12 carries a plurality of fiber optic strands of optical transmitting material, connecting different modules as shown schematically in FIG. 13. The body member 12 forms a serpentine configuration that defines an array of linear segments 216a–216f and a plurality of looped segments 220a–220e. The array of linear segments 216a–216f are disposed in a generally parallel, sequential relationship and disposed apart from one another at a spaced distance d' between the sequential ones of the linear segments 216a–216f. Respective ones of the looped segments 220a–220e interconnect the sequential ones of the array of linear segments 216a–216f. Although not by way of limitation, each linear segment 216a–216f has a plurality of legs 28 extending from a common lateral edge 230.

However, one of ordinary skill in the art would appreciate that one or more legs 28 can extend from an opposing lateral edge 232 or between the lateral edges 230 and 232. Similar to the exemplary embodiments of the fiber optic connectors of the invention described above, each looped segment 220a–220e has an inner radius $r_i$ of curvature that is greater than one half of the spaced distance d' and is at least equal to or greater than the minimum bend radius $r_{min}$ so that light can be transmitted from one leg 28 to another leg 28 through the body member 12.

One of ordinary skill in the art will appreciate that each one of the plurality of fiber optic strands of optical transmitting material extends to and between selected pairs of legs 28. As diagrammatically illustrated in FIG. 13, each one of the legs 28 on any one selected pair of legs 28 is located on a different one of the linear segments 216a–216f. The third exemplary embodiment of the fiber optic connector 210 of the invention is particularly useful for high density or complex optical interconnections of modules such as the assemblage of modules M1–M6 illustrated FIG. 1. Further, as with all embodiments of the fiber optic connector of the invention, the fiber optic connector is particularly useful where one half of the space distance d' is less than the minimum bend radius $r_{min}$ of the looped segments 216a–216f. In FIG. 12, the fiber optic connector 210 of the invention selectively and optically connects together the plurality of modules that are arranged in a juxtaposed relationship (as shown FIG. 1). For purposes of discussion, the optical connecting positions on the plurality of modules are labeled M1A–M6C. The respective legs 28 that extend from the common lateral edge 230 align with and engage the optical receptacles 4 in each of the modules M1–M6 at identical optical connection positions M1A-M6C, as shown in FIG. 1 and FIG. 13. With the legs 28 engaged with the optical receptacles 4, sequential ones of the array of linear segments 216a–216f are caused to be disposed apart from one another at the spaced distance d'. Again, each looped segment 220a–220e has an inner radius $r_i$ of curvature that is greater than one half of the spaced distance d' and is at least equal to or greater than the minimum bend radius $r_{min}$ so that light can be transmitted from one module to another, particularly as diagrammatically illustrated in FIG. 13. Specifically, byway of example only, each one of the plurality of fiber optic strands of optical transmitting material extends to and between selected pairs of legs 28 through the fiber optic ribbon fabric. Although not by way of limitation, each one of the legs on any one selected pair of legs is located on a different one of the linear segments. A skilled artisan would appreciate that the terminations 32 are sized and adapted to matably engage the optical receptacles 4 so that the fiber optic connector article 210 of the invention can be secured and provide light to the plurality of modules.

By comparison with the prior art, many optical connections can be made using a single fiber optic connector of the present invention. The single fiber optic connector can easily be installed onto a plurality of modules without creating a "bird's nest" effect. Further, the single fiber optic connector of the invention can be used with electronic modules without consideration of the width of the modules or spacing between adjacent optical receptacles on juxtaposed modules. Also, the single fiber optic connector of the invention can be removed from the plurality of modules and replaced without any reference to an installation manual designating the appropriate optical receptacles for the appropriate terminations.

The above-described exemplary embodiments of the invention have been described by way of example only. One of ordinary skill in the art would appreciate that modifications may be made to these exemplary embodiments without departing from the spirit and concepts of the inventions.

What is claimed is:

1. A fiber optic connector device for transmitting light, comprising:

a body member formed in a generally U-shaped configuration to define a first linear segment, a second linear segment and a looped segment interconnecting the first and second linear segments, the first and second linear segments extending generally parallel with one another and being disposed apart from one another at a spaced distance; and at least one strand of optical transmitting material carried by the body member to conform to the U-shaped configuration and having a minimum bend radius for transmitting light around the looped segment, whereby the looped segment has an inner radius of curvature greater than one half of the spaced distance and at least equal to or greater than the minimum bend radius.

2. A fiber optic connector device according to claim 1, wherein the body member is fabricated from at least one sheet of thin film.

3. A fiber optic connector device according to claim 2, wherein the at least one strand of optical transmitting material is embedded into the body member.

4. A fiber optic connector device according to claim 1, wherein the at least one strand of optical transmitting material is one of glass fiber or plastic fiber.

5. A fiber optic connector device according to claim 1, wherein the body member and the at least one strand of optical transmitting material is a polymeric waveguide.

6. A fiber optic connector device according to claim 1, wherein the body member and the at least one strand of optical transmitting material are fabricated from a flexible material.

7. A fiber optic connector device according to claim 1, wherein the inner radius of curvature of the looped segment is one of constant and variable.

8. A fiber optic connector device according to claim 1, wherein the body member includes a plurality of legs with at least one leg extending from a respective one of the first and second linear segments.

9. A fiber optic connector device according to claim 8, wherein each leg and the respective one of the first and second linear segments define respective planes.

10. A fiber optic connector device according to claim 8, wherein each one of the legs extends from a common lateral edge of the body member and terminates at a distal end leg portion.

11. A fiber optic connector device according to claim 10, wherein the body member includes a plurality of terminations with a respective one of the terminations connected to a respective one of the distal end leg portions.

12. A fiber optic connector device according to claim 11, wherein the at least one strand of optical transmitting material extends to and between any selected two terminations though the respective legs and the body member so that light is transmitted from one selected termination to the other selected termination.

13. A fiber optic connector device according to claim 1, wherein the looped segment includes a first transition looped segment portion and a second transition looped segment portion that connect the looped segment to respective ones of the first and second linear segments, the first transition looped segment portion having a first outer radius of curvature and the second transition looped segment portion having a second outer radius of curvature whereby the first and second outer radii of curvature are one of equal to each other and different from one another and each one of the first and second outer radii of curvature being at least equal to or greater than the minimum bend radius of the at least one strand of optical transmitting material.

14. A fiber optic connector device according to claim 1, wherein the looped segment includes a plurality of looped segment portions, at least one looped segment portion having a first inner radius and another looped segment portion having a second inner radius different from the first inner radius.

15. A fiber optic connector device according to claim 1, wherein the one half of the spaced distance is less than the minimum bend radius of the at least one strand of optical transmitting material.

16. A fiber optic connector device for transmitting light, comprising:

an elongated fiber optic ribbon fabric carrying a plurality of fiber optic strands of optical transmitting material with each fiber optic strand having a minimum bend radius, the fiber optic ribbon fabric formed in a serpentine configuration to define an array of linear segments and a plurality of looped segments, the array of linear segments disposed in a generally parallel, sequential relationship at a spaced distance between sequential ones of the linear segments and a respective one of the looped segments interconnecting the sequential ones of the array of linear segments, each linear segment having at least one leg extending from a lateral edge of the fiber optic ribbon fabric whereby each looped segment has an inner radius of curvature greater than one half of the spaced distance and at least equal to or greater than the minimum bend radius so that light can be transmitted from one leg to another leg through the fiber optic ribbon fabric.

17. A fiber optic connector device according to claim 16, wherein each one of the plurality of fiber optic strands of optical transmitting material extends to and between selected pairs of legs.

18. A fiber optic connector device according to claim 16, wherein the each one of the legs on any one selected pair of legs is located on a different one of the linear segments.

19. A fiber optic connector device according to claim 16, wherein each one of the legs has a distal end leg portion disposed away from the lateral edge and includes a termination connected to the distal end leg portion.

20. A fiber optic connector device according to claim 16, wherein each one of the legs extends from a common lateral edge of the body member and terminates at a distal end leg portion.

21. A fiber optic connector device according to claim 16, wherein the one half of the spaced distance is less than the minimum bend radius of each fiber optic strand.

22. A fiber optic connector device for selectively and optically connecting together a plurality of modules arranged in a juxtaposed relationship, each module having at least one optical receptacle formed therein, the fiber optic connector article comprising:

an elongated fiber optic ribbon fabric carrying a plurality of fiber optic strands of optical transmitting material with each fiber optic strand having a minimum bend radius, the fiber optic ribbon fabric formed in a serpentine configuration to define an array of linear segments and a plurality of looped segments, the array of linear segments disposed in a generally parallel, sequential relationship and a respective one of the looped segments interconnecting sequential ones of the array of linear segments, each linear segment having at least one leg extending from a common lateral edge of the fiber optic ribbon fabric and positioned along the common lateral edge to align with and engage the optical receptacles in each of the modules to optically connect together the plurality of modules thereby causing sequential ones of the array of linear segments to be disposed apart from one another at a spaced distance whereby each looped segment has an inner radius of curvature greater than one half of the spaced distance and at least equal to or greater than the minimum bend radius so that light can be transmitted from one module to another.

23. A fiber optic connector device according to claim 22, wherein each one of the plurality of fiber optic strands of optical transmitting material extends to and between selected pairs of legs through the elongated fiber optic ribbon fabric.

24. A fiber optic connector device according to claim 23, wherein the each one of the legs on any one selected pair of legs is located on a different one of the linear segments.

25. A fiber optic connector device according to claim 22, wherein each one of the legs has a distal end leg portion disposed away from the common lateral edge and includes a termination connected to the distal end leg portion and sized and adapted to matably engage the optical receptacle.

* * * * *